(12) United States Patent
Broussard

(10) Patent No.: US 6,269,483 B1
(45) Date of Patent: Jul. 31, 2001

(54) METHOD AND APPARATUS FOR USING AUDIO LEVEL TO MAKE A MULTIMEDIA CONFERENCE DORMANT

(75) Inventor: Scott J. Broussard, Cedar Park, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/213,911

(22) Filed: Dec. 17, 1998

(51) Int. Cl.$^7$ .................................................. H04N 7/16
(52) U.S. Cl. ................................. 725/143; 348/14.12
(58) Field of Search .................. 348/17, 14, 15, 348/13, 16, 18, 12, 7, 14.12, 14.13, 14.14, 14.15; 725/105, 106, 131, 143, 144, 146, 147; H04N 7/14, 7/15, 7/16, 7/10, 7/173

(56) References Cited

U.S. PATENT DOCUMENTS

| 5,392,223 | | 2/1995 | Caci . | |
|---|---|---|---|---|
| 5,500,673 | * | 3/1996 | Zhou | 348/156 |
| 5,548,346 | * | 8/1996 | Mimura et al. | 348/738 |
| 5,594,494 | * | 1/1997 | Okada et al. | 348/15 |
| 5,684,527 | * | 11/1997 | Terui et al. | 348/15 |
| 5,760,825 | * | 6/1998 | Grenier | 348/15 |
| 5,963,246 | * | 10/1999 | Kato | 348/15 |

\* cited by examiner

*Primary Examiner*—Chris Grant
(74) *Attorney, Agent, or Firm*—Morgan & Finnegan, L.L.P.

(57) ABSTRACT

A method automatically limits the transmission of a video stream from a terminal to a network. The method includes a capturing step which captures a video and audio stream from a camera and microphone at a terminal participating in a video-conference. A transmitting step transmits the audio and video streams to the network and a varying step varies the amount of video stream data transmitted in the transmitting step to the network based on an audio level of the audio stream. An apparatus automatically limits the transmission of a video stream from a terminal to a network. The apparatus includes a microphone, a camera, a network interface and a processor. The microphone and camera respectively capture audio and video stream data from a participant in a video conference. The network interface is coupled to a network, for transmitting the audio and video stream data to the network. The processor is coupled to the microphone, the camera and the network interface. In operation, the processor reads the video and audio stream data and varying the amount of video stream data sent to the network interface for transmission to the network based on an audio level of the audio stream. The apparatus is typically a desktop or portable computer or hand-held communications device.

23 Claims, 4 Drawing Sheets

METHOD AND APPARATUS FOR USING AUDIO LEVEL TO MAKE A MULTIMEDIA CONFERENCE DORMANT

FIELD OF THE INVENTION

The present invention relates to the field of audio-visual telecommunications. In particular, the invention relates to video telecommunications between a plurality of conferees, each producing an output video stream and an output audio stream. A particular video stream and audio stream may be rendered dormant based on the audio level of an audio stream.

BACKGROUND OF THE INVENTION

With the recent proliferation of inexpensive, powerful computer technology, methods of communication have progressed significantly. The ordinary voice telephone call, an efficient communication technique, is now accompanied by efficient and widely used alternatives such as electronic mail and on-line chat rooms which allow participants to convey text, images and other data to each other over computer networks.

Video conferencing is another technique for communication which allows participants to convey both sound and video in real time to each other over computer networks. Video conferencing has been cost prohibitive for individuals and corporations to put into wide-spread use. Recently, however, technology has progressed such that video conferencing technology is available, at a reasonable cost, for implementation at terminals such as a desktop or portable computer or hand-held communications device.

Video-conferencing terminals are typically equipped with a video camera and a microphone for respectively capturing, in real-time, video images and sound from participants of the video-conference. The terminals also typically include a display and a speaker for playing the video images and sound in real time to the participants. When a video conference has two participants, it is called a point-to-point conference. Typically, in this arrangement, each terminal will capture video and sound from the participant stationed at the terminal and will transmit the captured video and audio streams to the other terminal. Each terminal will also play the video and audio streams received from the other terminal on the display and speakers respectively of the terminal.

When a video conference has more than two participants, it is called a multi-point videoconference. Typically, in this arrangement, each terminal will capture video and sound from the participant stationed at the terminal. Subsequently, the captured video and audio streams will be transmitted either directly or indirectly to the other terminals. Each terminal will then display one or more video streams and play the audio streams from the other participants.

A problem to confront in multi-point video-conferences concerns the large volume of video and sound data which must be processed and transmitted between the terminals. Terminals are typically coupled together over packet switched networks, such as a local area network (LAN), a wide area network (WAN) or the Internet. Packet switched networks have limited amounts of bandwidth available. The available bandwidth may quickly be exceeded by the video and audio stream data produced by participants in a multi-point video conference.

Moreover, once the video and audio streams arrive at a terminal, the terminal must process the data prior to playing it on the display and speaker. Processing multiple video streams is demanding of the terminal's processing capability. The processing capability of a terminal may quickly be exceeded by having to process more than one video stream for display. In this event, the video and audio streams may become distorted or cease to be played by the terminal.

There is a need for an automatic mechanism to control the transmission of videoconferencing data from a terminal that is participating in a video-conference. Specifically, there is a need for an automatic mechanism to reduce the transmission of high-bandwidth data when a participant at the terminal is not speaking anymore. A conventional videoconferencing program, CU-SeeMe provides a manual mechanism for starting and stopping the transmission of video data from a terminal involved in a videoconference. CU-SeeMe provides a key on the keyboard which must be depressed when a participant desires his video and audio streams to be transmitted. The participant must release the key when the participant stops speaking. During the period when key is depressed, that participant's video stream is transmitted over a network to other terminals participating in the video conference.

SUMMARY OF THE INVENTION

According to the present invention, a method automatically limits the transmission of a video stream from a terminal to a network. The method includes a capturing step which captures a video and audio stream from a camera and microphone at a terminal participating in a videoconference. A transmitting step transmits the audio and video streams to the network and a varying step varies the amount of video stream data transmitted in the transmitting step to the network based on an audio level of the audio stream.

In one embodiment, the varying step results in reducing the amount of video stream data transmitted to the network when the audio level of the audio stream has a value which falls below a predetermined threshold. In another embodiment, the varying step results in increasing the amount of video stream data transmitted to the network when the audio level of the audio stream has a value which rises above a predetermined threshold. The method results in a saving of network bandwidth because video streams of video conference participants who are not contributing to the video conference are throttled back, restoring bandwidth to the network for allocation to other uses.

An apparatus according to the present invention automatically limits the transmission of a video stream from a terminal to a network. The apparatus includes a microphone, a camera, a network interface and a processor. The microphone and camera respectively capture audio and video stream data from a participant in a video conference. The network interface is coupled to a network, for transmitting the audio and video stream data to the network. The processor is coupled to the microphone, the camera and the network interface. In operation, the processor reads the video and audio stream data and varying the amount of video stream data sent to the network interface for transmission to the network based on an audio level of the audio stream. The apparatus is typically a desktop or portable computer or hand-held communications device.

BRIEF DESCRIPTION OF THE FIGURES

The above described features and advantages of the present invention will be more fully appreciated with reference to the appended figures and detailed description.

DETAILED DESCRIPTION OF THE INVENTION

Figure 1:
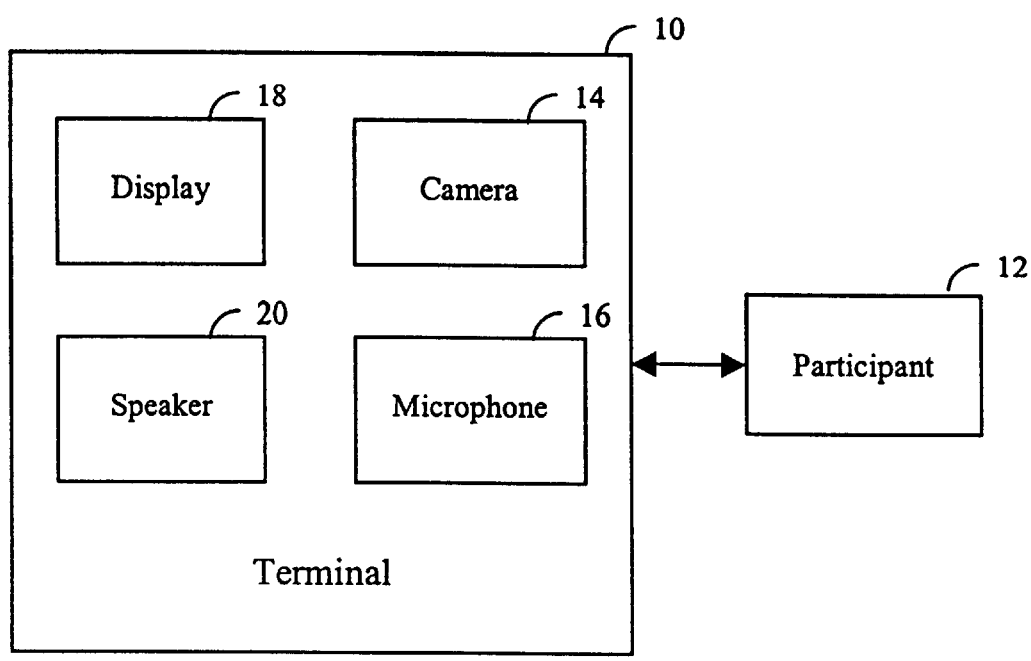
FIG. 1 depicts a block diagram of a conventional video conferencing terminal.

FIG. 1 depicts a block diagram of a conventional video conferencing terminal 10, which is used by a participant 12 so that the participant 12 may participate in a video conference. The terminal 10 includes a camera 14 and a microphone 16 for capturing, respectively, video and sound from the participant 12. The terminal 10 also includes a display 18 and a speaker 20 for playing, respectively, video and sound from a video conference to the participant 12. The terminal 10 is also coupled to a network 22. The network 22 is typically a packetized network such as a local area network, a wide area network, or the Internet.

During a video conference, the terminal 10 sends a video and an audio stream over the network 22 to other terminals belonging to participants participating in a video conference. The network 22 is typically a IP network. Video and audio stream data are broken up into packets of information at the terminal 10 and are transmitted over the network 22 to other terminals in a well known manner. The packets at the receiving terminal are then received, reordered where appropriate, and played for the participant at the receiving terminal 10. The protocol used for transmission may be the TCP protocol, which is a reliable protocol. However, preferably, the protocol is a UDP protocol, which is a protocol for the transmission of unreliable data. Preferably, packets are transmitted pursuant to the RTP/RTCP protocols. These protocols are UDP type protocols.

Figure 2:
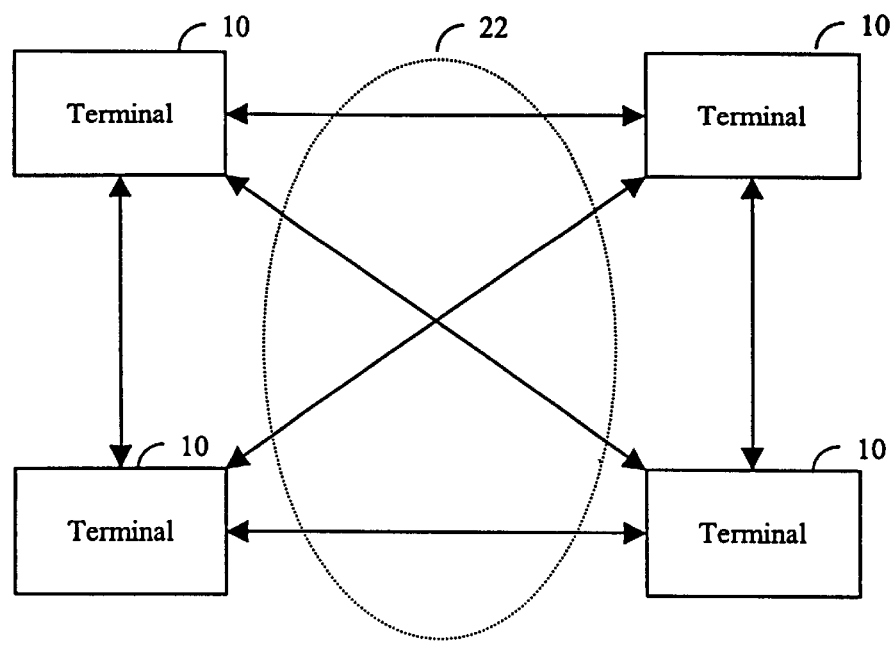
FIG. 2 depicts a conventional multi-point video conference involving 4 terminals interconnected in a point-to-point configuration.
Figure 3:
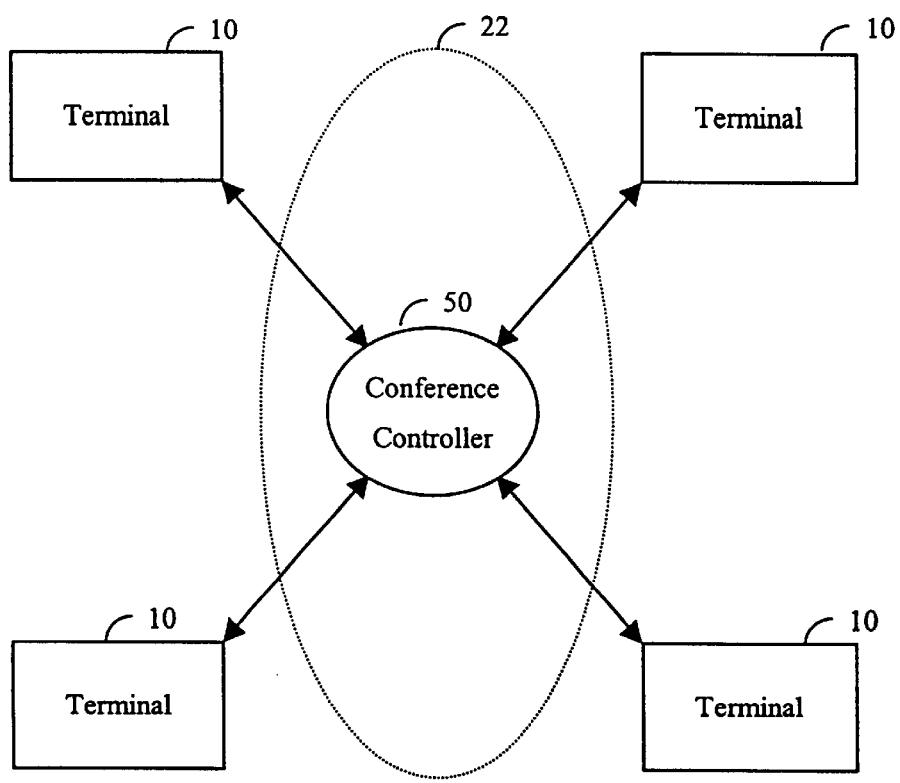
FIG. 3 depicts a conventional multi-point video conference involving 4 terminals interconnected in a broadcast configuration.

When a conference has two participants, it is called a point-to-point conference. When a conference has more than two participants, it is called a multi-point video conference. FIGS. 2 and 3 depict different schemes for interconnecting terminals 10 that are participating in a multi-point video conference over a network 22. FIG. 2 depicts a peer-to-peer arrangement for video conferencing. In a peer-to-peer arrangement, each terminal transmits video and audio streams to each other terminal 10. Similarly, each terminal 10 receives video and audio stream data from each other terminal 10. When a large number of participants participate in a video conference, a peer-to-peer arrangement can result in an unmanageable proliferation of data being transferred over the network 22, resulting in degraded quality of the audio and video streams received by and played at the terminals 10.

FIG. 3 depicts another multi-point video conference arrangement called a broadcast connection. In the broadcast connection, each terminal 10 exchanges data with a conference controller 50 over the network 22. The conference controller 50 is typically a server which receives packetized data over the network and routes packetized data over the network to another terminal 10. During a video conference, the conference controller 50 receives video and audio streams from each terminal 10. The video and audio stream data received from each terminal 10 is packetized data, where each packet of data includes a conference identifier. The conference identifier is used by the conference controller 50 to route the received audio and video streams to the other terminals 10 participating in the conference identified by the video conference identifier. The broadcast technique generally makes more efficient use of network bandwidth when a multi-point video conference.

Figure 4:
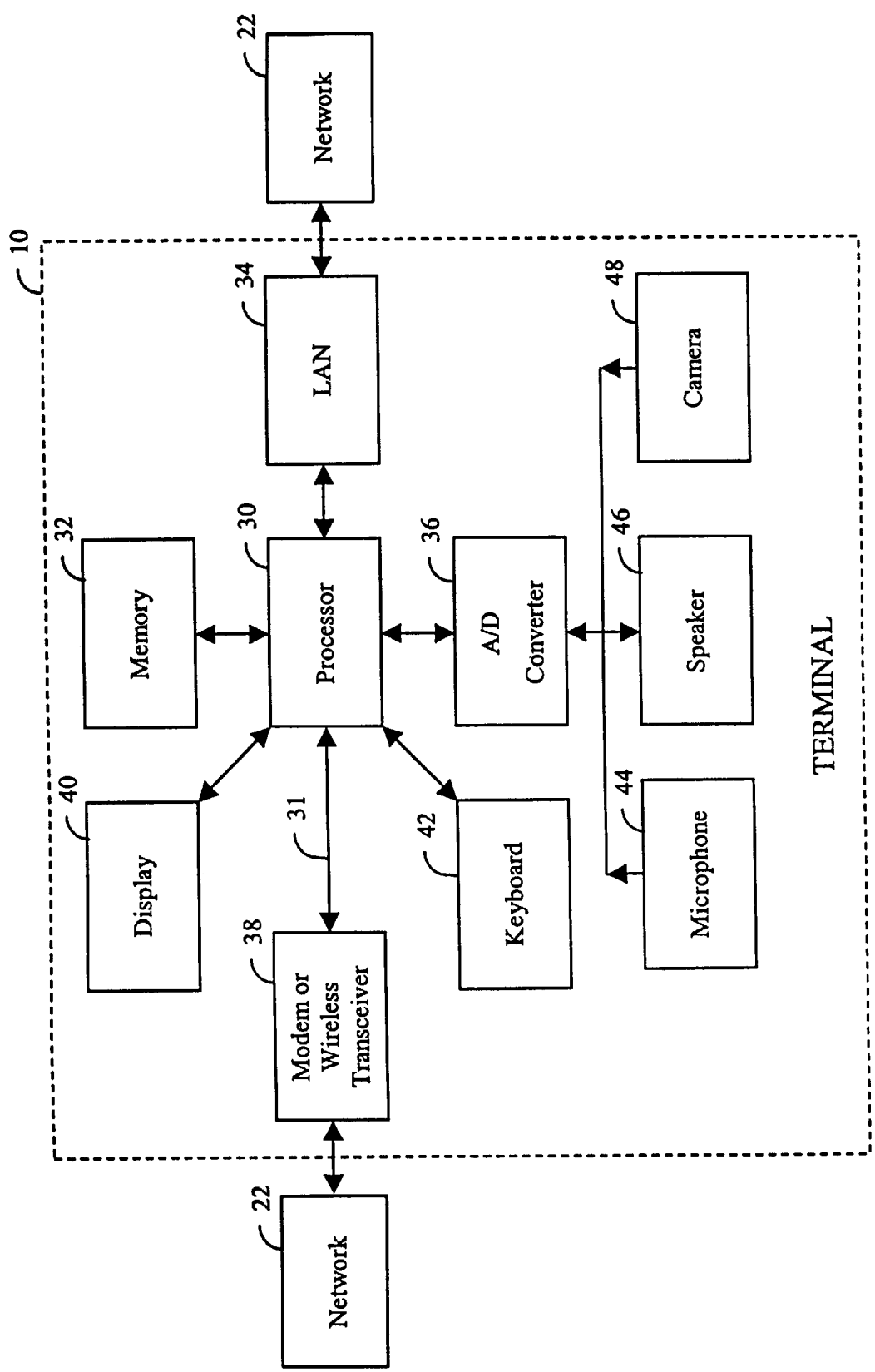
FIG. 4 depicts an internal view of a video-conferencing terminal according to the present invention.

FIG. 4 depicts the functional blocks within a terminal 10. The terminal 10 includes a processor 30 which is connected over a bus 31 to a local area network (LAN) interface 34, a memory 32, an analog-to-digital (A/D) and digital-to-analog (D/A) converter 36, a modem 38, a display 40, and a keyboard 42. The memory 32 may include read only memory (ROM), random access memory (RAM), hard disk drives, tape drives, floppy drives, and any other device capable of storing information. The memory 32 stores data and application program instructions which are used by the processor 30 to provide functionality to the terminal 10. The LAN interface 34 is coupled to the bus 31 and the network 22.

The LAN interface 34 receives video and audio stream data from the processor bus 31, packetizes the video and audio stream data, and transmits the packetized data to the network 22. The packetized data may be transmitted using a plurality of protocols including RTP, RTSP, H.323 among others. The LAN interface 34 may also transmit packets pursuant to a control protocol, such as RTCP. The packets exchanged between a terminal 10 and the network 22 pursuant to a control protocol illustratively include information concerning joining and leaving a conference, membership in a video-conference (or chat room) and bandwidth allocations to various connections and paths between terminals 10. The LAN interface 34 also receives video and audio stream data in packetized form from the network 22. The LAN interface 34 translates the received packets into data usable by the processor 30 and places the translated data onto the processor bus 31. In addition, the LAN interface 34 may perform functions such as data compression prior to packetized transmission in order to conserve network 22 bandwidth.

An A/D, D/A converter 36 is coupled in a conventional manner between the processor bus 31 and a microphone 44, a speaker 46 and a camera 48. The A/D, D/A converter 36 converts data from the bus 31, which is in a digital format, to an analog format for use with the microphone 44, the speaker 46 and the camera 48 and vice versa. The digital audio data transmitted to the bus 31 is typically in a pulse code modulated (PCM) data format. The PCM data may be 8 or 16 bit PCM data or any other convenient PCM data format. Data received by the A/D, D/A converter 36 from the microphone 44 is an analog signal representing sound waves received by the microphone 44. The A/D, D/A converter samples the sound signal at a predetermined rate, for example, 11, 22, 44, 56 or 64 kHz, and converts the sample signal into PCM data for transmission to the bus 31. Each sample has an audio level associated with it and collectively, the sampled levels are a digitized representation of the sound received by the microphone 44 called the audio stream. Similarly, the camera 48 produces a signal based on the images sensed by the camera. Typically, the camera with be trained on a participant in the video conference. The video signal is then converted by the A/D, D/A converter 36 into a format suitable for processing by the processor 30, such as RGB or YUV. The speaker 46, coupled to the A/D, D/A converter, produces sound for a participant at the terminal 10. The A/D, D/A converter 36 receives pulse code modulated (PCM) data representing an audio stream from the bus 31. The A/D, D/A converter converts the PCM data to a sound signal which is sent to speaker 46. The speaker 46 then expands and rarefies air in response to the sound signal to produce sound audible by the participant at the terminal 10.

The display 40 is coupled to the bus 31. The display 40 displays, among other things, video from the packetized video stream received from the network 22. The keyboard 42 is coupled to the processor 30 over bus 31 and behaves in a conventional manner to allow input of data to the terminal 10.

The terminal 10 is typically configured to have video conferencing software resident in memory 32. The video conferencing software includes a plurality of instructions which are executed by the processor 30. These instructions are followed by the processor 30 to provide video conferencing in a conventional manner. A widely used video conferencing program is CU-SeeMe. CU-SeeMe, as well as other well-known video conferencing software applications, causes a processor 30 to process video and audio stream data and exchange the data between the network 22 and the display 40, keyboard 42, microphone 44, speaker 46 and camera 48 of the terminal over the bus 31 in a conventional manner. In addition, video conferencing software, such as CU-SeeMe, exchanges data with a packetized network 22 in a conventional manner, such as by using the h.323 video conferencing protocol. In addition to h.323, any other suitable protocol may be used for exchanging audio and video stream data with the network 22. Other examples include the real-time transport protocol (RTP), the real-time streaming protocol (RTSP) among others. The terminal 10 may also include a modem and wireless transceiver 38, coupled to the bus 31. The wireless transceiver 38 may also be coupled to the network 22. In this event, the wireless transceiver may include an antenna for exchanging video and audio stream data with a cellular network pursuant to a protocol such as CDPD or H.324. Typically, in this configuration, the terminal 10 will be a hand-held communications or computing device or portable computer.

Figure 5:
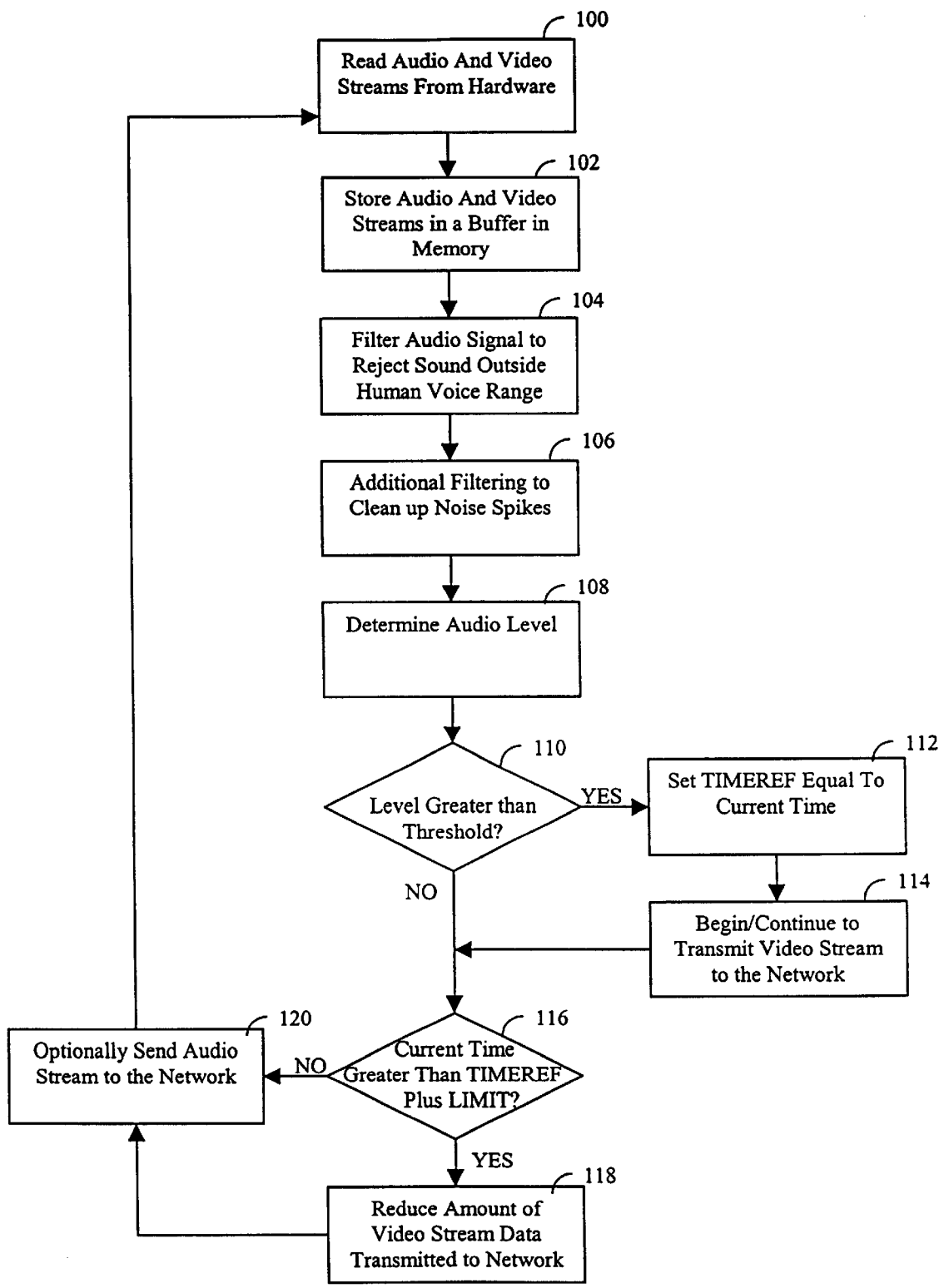
FIG. 5 depicts a method of making a video stream dormant based on the audio level of the audio stream according to the present invention.

FIG. 5 depicts a method of receiving and processing audio and video streams from a network 22. The method steps depicted in FIG. 5, in practice, would be represented as software instructions resident in memory 32 of terminal 10. The software instructions may be uploaded to the memory 32 of the terminal from a floppy or hard disk drive, a ROM device, a computer network or any other appropriate data storage and transfer technique. The processor 30 would then execute the method steps depicted in FIG. 5.

In step 100, the processor 30 reads audio and video streams from the microphone 42 and the camera 46. The audio and video streams are destined for other terminals 10 that are coupled to the network 22 and belong to participants of the video conference. Typically, the audio stream from the microphone 44 is converted from raw audio to PCM data and the video stream from the camera 48 is converted form raw video data to RGB or YUV by the A/D, D/A converter 36. In step 102, the processor stores the converted audio and video streams in a buffer in the memory 32.

In step 104, the audio stream data is filtered to reject sound outside of the human voice range. This step is optional and is performed when the emphasis of a video conference is on conveying speech through the audio channel of the video conference. However, it is contemplated that other types of sounds may be desirable for transmission over the audio stream of a video conference to conference participates. In the latter scenario, it may be undesirable to reject sounds outside of the human voice range in step 104.

In step 106, additional filtering is performed on the audio stream that has been selected for processing. The filtering in step 106 is designed to operate in a conventional manner to filter out noise spikes such as may occur when an object strikes the floor and makes a loud noise.

In step 108, the processor 130 determines an audio level for the selected audio stream. The audio level represents a time-averaged amplitude of the sound or volume of the sound represented by the audio stream. Any suitable algorithm may be used for the time averaged audio level over a suitably long period of time, for example 10 seconds to 2 minutes, preferably 1 minute. The following formula is an example:

$$newlevel = (A * newlevel + B * sampledlevel)$$

In the above formula, newlevel represents the time-averaged audio level of the audio stream. Sampledlevel represents the amplitude or audio level of sound present during a moment of time stored as a value in the buffer in the memory 32. A series of sampledlevel values represents the digitized stream of sound captured by the microphone of a participant 12 of the video conference. A and B are typically constants that when added together equal 1. Their values are chosen to reflect the rate of change of the time-averaged, audio level (newlevel) in response to the most recent samples of the audio stream. For example, if A is zero, and B is one, then at any given stage of processing, newlevel will equal the presently sampled level. By contrast, if A is 1 and B is 0, newlevel will always be 0, because the most recent samples in the audio stream will be discarded. A and B may be given any value between 0 and 1. However, preferably, A is between 0.5 and 1 and B is between 0 and 0.5. The constants A and B are chosen based on the audio sample rate and desired rate of change. In practice, the choice of constants A and B will affect the sensitivity of the automatic system for throttling up/down the video stream sent to the network in response to sound received by the microphone 46. Ideally, A and B are selected to avoid the problem of having fast switching on/off of audio and video streams issuing forth from the terminal 10 to the network 22 in response to variable volume of sound received by the microphone 46. Moreover, the formula for newlevel presented above is meant to be illustrative. Any formula may be chosen based on the considerations discussed above.

In step 110, the processor 30 determines whether the audio stream has an audio level that exceeds a predetermined threshold. If so, then step 112 begins. If not, step 116 begins. In step 112, a variable TIMEREF is set equal to the current time. Then, in step 114, the processor begins to transmit the audio and video stream that is being captured by the microphone 42 and camera 46 of the terminal 10 over the network to participants in the video-conference. If, upon entry into step 114, the processor 30 had already been transmitting the audio and video streams to the network 22, then the processor 30 would merely continue to do so. After step 114, step 116 begins.

In step 116, the processor determines whether a current time value is greater than the value TIMEREF plus another value LIMIT. LIMIT represents a duration of time and TIMEREF represents the time at which the audio level last exceeded the predetermined threshold in step 110. If the current time value is greater than TIMEREF plus LIMIT, this signifies that the audio level has been below the predetermined threshold for longer than a time limit indicated by the value LIMIT, which may be adjusted. When this occurs, then step 118 begins and the processor reduces the amount of video stream data sent over the network 22 to other terminals 10 involved in the video conference. In a preferred embodiment, in step 118, the processor 30 transmits the last frame of the video stream as a still frame over the network 22 to the other conference participants. Step 118 greatly reduces traffic within the network 22 caused by the videoconference because at any given time in a multi-point video conference, many terminals may "throttle back" or suppress the production of high-bandwidth video streams. This may occur because a participant in a video conference has stopped speaking for a moment or because a participant has left his terminal 10 without disconnecting from the video conference.

In step 120, which may be reached from either step 116 or step 118, the processor may optionally continue to transmit the audio stream to the network 22 for playing to the participants of the video conference. After step 120, step 100 begins again and more of the audio and video streams are read from the microphone 42 and camera 46 of the terminal 10 respectively.

What is claimed is:

1. A method for automatically limiting the transmission of a video stream from a terminal to a network, comprising the steps of:
    capturing video stream data and audio stream data from a camera and a microphone respectively at a terminal participating in a videoconference;
    determining at the terminal an audio level of the audio stream data;
    transmitting the audio and video stream data to a network; and
    varying the amount of video stream data transmitted to the network from the terminal based on the audio level of the audio stream data determined in the determining step.

2. The method according to claim 1, wherein the varying step results in reducing the amount of video stream data transmitted to the network when the audio level of the audio stream has a value which falls below a predetermined threshold.

3. The method according to claim 1, wherein the varying step results in increasing the amount of video stream data transmitted to the network when the audio level of the audio stream has a value which rises above a predetermined threshold.

4. The method according to claim 1, wherein the audio stream comprises a series of sampled sound values, further comprising the step of:
    determining, continuously, the audio level of the audio stream based on the series of sampled sound values on a time-averaged basis.

5. The method according to claim 1, further comprising the step of:
    filtering the audio stream to remove noise interference and frequencies outside of a range of frequencies produced by human voice;
    determining the audio level of the audio stream after the filtering step.

6. The method according to claim 1, further comprising the step of:
    varying the amount of video stream data transmitted to the network based on an amount of time that the audio level of the audio stream data is below a threshold level.

7. The method according to claim 1, wherein the terminal is a hand-held communications device.

8. An apparatus for automatically limiting the transmission of a video stream from a terminal to a network, comprising:
    a microphone for capturing audio stream data at a terminal from a participant in a video conference;
    a camera for capturing a video stream data at the terminal from the participant;
    a network interface, coupled to a network, for transmitting the audio and video stream data to the network; and
    a processor, coupled to the microphone, the camera and the network interface, the processor reading the video and audio stream data, determining at the terminal an audio level of the audio stream data, and varying the amount of video stream data sent to the network interface for transmission to the network from the terminal based on the audio level of the audio stream data.

9. The apparatus according to claim 8, wherein the processor varies the amount of video stream data transmitted to the network by reducing the amount of video stream data transmitted to the network when the audio level of the audio stream data has a value which falls below a predetermined threshold.

10. The apparatus according to claim 8, wherein the processor varies the amount of video stream data transmitted to the network by increasing the amount of video stream data transmitted to the network when the audio level of the audio stream data has a value which rises above a predetermined threshold.

11. The apparatus according to claim 8, wherein the audio stream comprises a series of sampled sound values and the processor determines, continuously, the audio level of the audio stream data based on the series of sampled sound values on a time-averaged basis.

12. The apparatus according to claim 8, wherein the processor filters the audio stream data to remove noise interference and frequencies outside of a range of frequencies produced by human voice and the processor determines the audio level of the audio stream after the filtering step.

13. The apparatus according to claim 8 wherein the varies the amount of video stream data transmitted to the network based on an amount of time that the audio level of the audio stream data is below a predetermined threshold.

14. A computer program product for automatically limiting the transmission of a video stream from a terminal to a network, comprising:
    a computer useable medium having computer program logic stored therein, wherein the computer program logic comprises:
    capturing means for causing the terminal to capture video and audio stream data from a camera and a microphone respectively at a terminal participating in a videoconference;
    determining means for determining at the terminal an audio level of the audio stream data;
    transmitting means for causing the terminal to transmit the audio and video stream data to a network; and
    varying means for causing the terminal to vary the amount of video stream data transmitted to the network from the terminal based on the audio level of the audio stream data determined by the determining means.

15. The computer program product according to claim 14, wherein the varying means causes the terminal to reduce the amount of video stream data transmitted to the network when the audio level of the audio stream has a value which falls below a predetermined threshold.

16. The computer program product according to claim 14, wherein the varying means causes the terminal to increase the amount of video stream data transmitted to the network when the audio level of the audio stream has a value which rises above a predetermined threshold.

17. The computer program product according to claim 14, wherein the audio stream comprises a series of sampled sound values, and the computer program product further comprises:
   determining means for causing the terminal to determine continuously, the audio level of the audio stream data based on the series of sampled sound values on a time-averaged basis.

18. The computer program product according to claim 14, further comprising:
   filtering means for causing the terminal to filter the audio stream data to remove noise interference and frequencies outside of a range of frequencies produced by human voice; and
   determining means for causing the terminal to determine the audio level of the audio stream after the filtering step.

19. The computer program product according to claim 14, further comprising:
   varying means for causing the terminal to vary the amount of video stream data transmitted to the network based on an amount of time that the audio level of the audio stream data is below a threshold level.

20. The computer program product according to claim 15, wherein the varying means causes the terminal to suppress transmission of the video stream data.

21. A method for automatically limiting the transmission of a video stream from a terminal to a network, comprising the steps of:
   capturing video stream data and audio stream data from a camera and a microphone, respectively, at a terminal participating in a videoconference with at least one other terminal;
   transmitting the audio and video stream data to a network;
   sensing an audio level of the audio stream data at each terminal;
   varying the amount of video stream data transmitted to the network from each terminal based on the audio level sensed.

22. An apparatus for automatically limiting the transmission of a video stream from a terminal to a network, comprising:
   a microphone for capturing audio stream data from a participant in a videoconference with at least one other participant;
   a camera for capturing a video stream data from the participant;
   a network interface, coupled to a network, for transmitting the audio and video stream data to the network;
   a processor for each participant, coupled to the microphone, the camera and the network interface, each processor reads the video and audio stream data, senses the audio stream as measured from each respective participant, and varies the amount of video stream data sent to the network interface for transmission to the network from each participant based on an audio level sensed.

23. A computer program product for automatically limiting the transmission of a video stream from a terminal to a network, comprising:
   a computer useable medium having computer program logic stored therein, wherein the computer program logic comprises:
   capturing means for causing capture of video and audio stream data from a camera and a microphone respectively at a terminal participating in a video-conference with at least one other terminal;
   transmitting means for causing the terminal to transmit the audio and video stream data to a network;
   sensing means for measuring an audio level of the audio stream data at each terminal;
   varying means for causing the terminal to vary the amount of video stream data transmitted to the network from each terminal based on the audio level sensed.

* * * * *